Aug. 9, 1938.  L. A. MAPES  2,126,402
FILLING APPARATUS
Filed Sept. 14, 1936   2 Sheets-Sheet 1
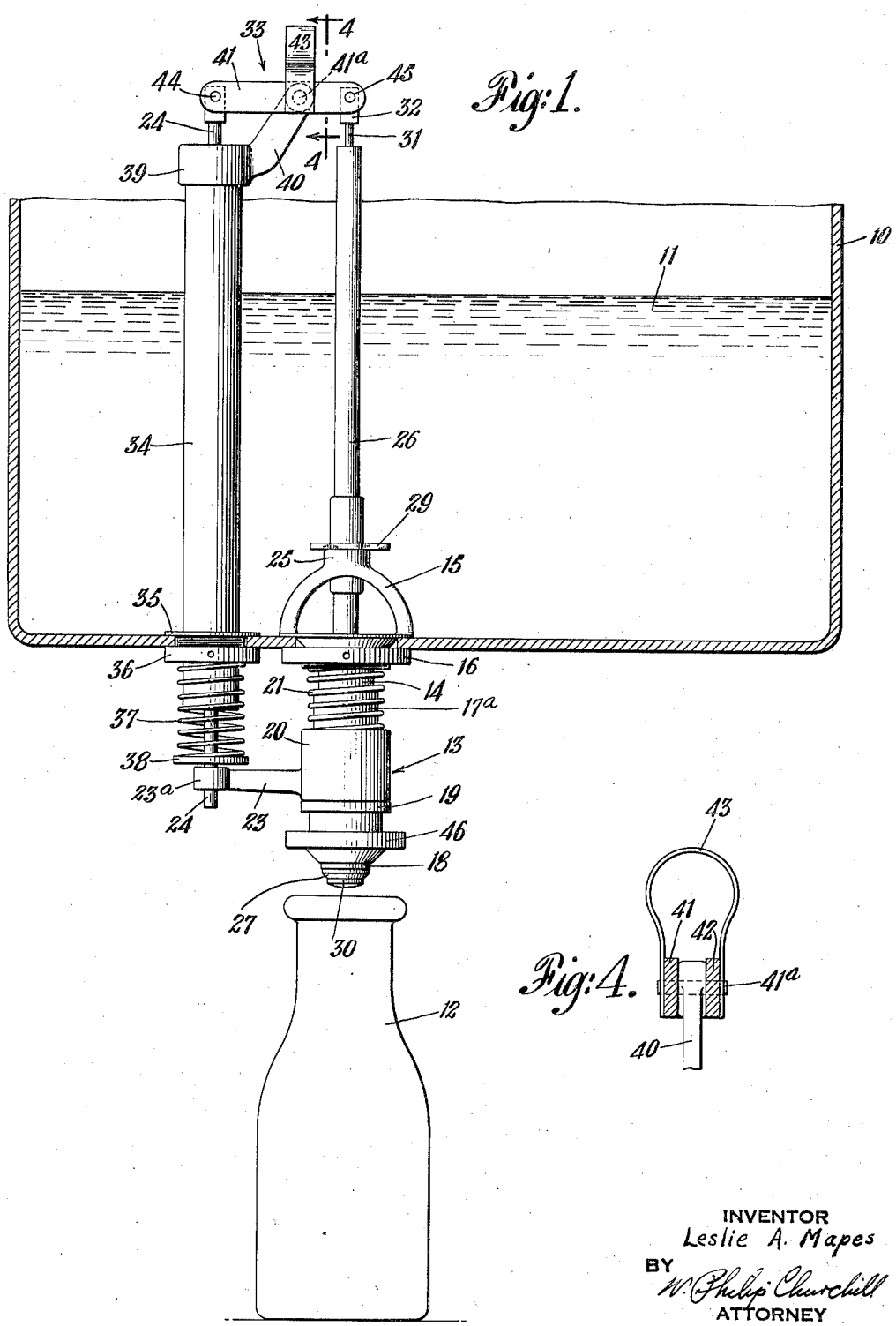
INVENTOR
Leslie A. Mapes
BY
W. Philip Churchill
ATTORNEY Aug. 9, 1938.            L. A. MAPES            2,126,402
                       FILLING APPARATUS
              Filed Sept. 14, 1936        2 Sheets-Sheet 2
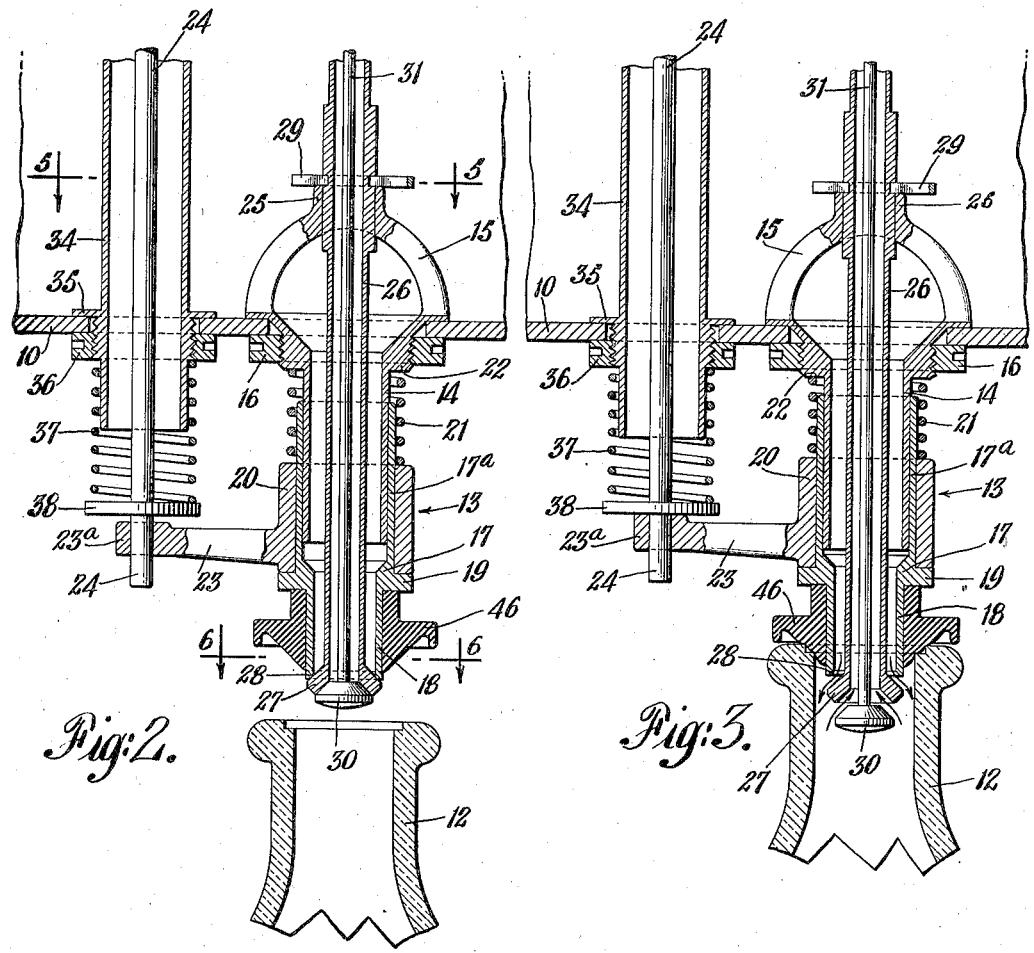
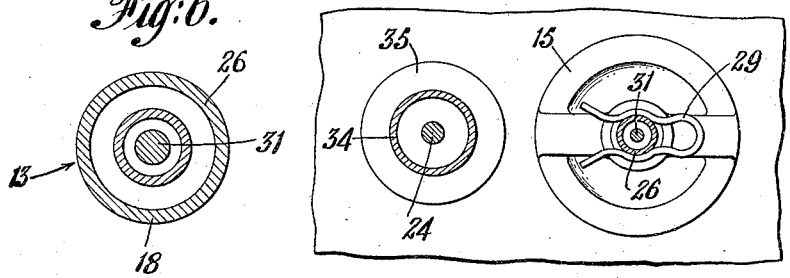
INVENTOR
Leslie A. Mapes
BY
W. Philip Churchill
ATTORNEY Patented Aug. 9, 1938

2,126,402

UNITED STATES PATENT OFFICE 2,126,402

FILLING APPARATUS

Leslie A. Mapes, Palisade, N. J., assignor to The Borden Company, New York, N. Y., a corporation of New Jersey Application September 14, 1936, Serial No. 100,612

10 Claims. (Cl. 226—124)

This invention relates to apparatus for filling containers such as bottles, and is more particularly directed to apparatus which is especially suitable for filling small neck bottles with milk and similar liquids.

In the filling of bottles, such as milk bottles, a constant level or head of milk is usually maintained in a reservoir and bottles are successively applied to nozzles connected to this reservoir for receiving milk therefrom.

The bottles when applied to the filling nozzle are, of course, full of air which must be allowed to escape as the milk flows into the bottle. This becomes a rather difficult problem when bottles having a neck of small internal diameter are employed and the present day tendency is to use such small neck bottles wherever possible in order to reduce the cost of capping.

Vent tubes for the escape of air have been previously employed within the nozzle for delivering milk to the bottle. As the bottle becomes full, milk flows up into the vent tube under the head of liquid in the reservoir. Prior to my invention, it was the practice to allow the milk in this vent tube to flow back into the bottle as the bottle dropped away from the nozzle, in order to fill up the space occupied by the nozzle in the neck of the bottle during the major portion of the filling operation. With smaller neck bottles, the nozzles must be made correspondingly smaller and if the vent tube size is reduced accordingly, the rate of filling these bottles must be substantially decreased. On the other hand if the vent tube is maintained in its original size, the head of milk in the reservoir must be reduced, also reducing the filling rate, or too much milk will flow back into the bottle at the end of the filling operation causing overfilling.

My invention provides apparatus for overcoming these difficulties and one object thereof is to provide apparatus which may be designed to fill small neck bottles rapidly without causing over- or underfilling.

A further object is to provide filling apparatus in which the air valve may be quickly closed, to prevent dripping after one bottle has been filled and before the next bottle is in filling position.

A further object of my invention is to provide means for operating the air valve in a filling apparatus which is offset from the main filling nozzle and is of simple construction.

Another object of this invention is to provide apparatus for filling small neck bottles rapidly, which has the advantage of being easy to take apart and clean under usual dairying conditions.

Further objects and advantages of the invention will be more apparent from a consideration of one embodiment thereof illustrated in the drawings in which Fig. 1 is a side elevation of a bottle and filling apparatus in accordance with my invention, with part of a milk reservoir shown in vertical section. Fig. 2 is a vertical section through approximately the center of the filling apparatus in the position occupied before the filling operation starts. Fig. 3 is a view similar to Fig. 2 but illustrating the apparatus in the position occupied during the filling operation. Fig. 4 is a detailed sectional view taken on the line 4—4 of Fig. 1. Fig. 5 is a horizontal section taken on the line 5—5 of Fig. 2 and Fig. 6 is a horizontal section, on an enlarged scale, of the filling nozzle taken on the line 6—6 of Fig. 2.

Numeral 10 indicates a reservoir of any suitable type containing a fluid 11, such as milk. Such a reservoir may be stationary or arranged to move synchronously with bottles carried therebelow on a conveyor, as is well understood in the art. As a bottle 12 arrives in a position beneath the filling nozzle 13, the bottle is moved upward and pressed firmly against the nozzle to open the valves and start the filling operation.

In accordance with my invention a depending tubular conduit 14 may be formed integrally with a yoke 15. This member, composed of conduit 14 and yoke 15, may be seated in an opening in the bottom of the reservoir 10 and tightly clamped in place by means of the collar 16 threaded to a portion of the conduit. The upper section 17a of the filling nozzle 17 is preferably fitted over the depending portion of the tubular member 14 in telescoping relationship therewith. This filling nozzle 17 has a lower nozzle portion 18 of suitable diameter and is provided with an intermediate collar portion 19. A sleeve 20 is fitted over the upper portion 17a of the nozzle member 17 and rests against the collar 19. The upper edge of the sleeve 20 is in contact with the spring 21 which is compressed against a shoulder 22 of the member 14 upon upward movement of the nozzle member 17. This sleeve 20 is also provided with an integral arm 23 having a collar 23a at its extremity arranged to slide over the rod 24. Fitted into a sleeve portion 25 of the yoke 15 is the vent tube 26, the top of which extends up above the surface of the liquid in the reservoir 10 to allow air to escape from the bottle 12 as it is displaced by milk. The lower portion of this tube 26 extends down through the conduit 14 and the nozzle member 17 and is provided with a flared or bell-like lower end 27 to deflect milk or other liquid passing down through the nozzle, against the side walls of the bottle 12. The lower end of the nozzle member 17 may be counter-sunk, or provided with a bevelled surface as at 28 to provide a tight fit with the outer surface of the bell-shaped end 27. The vent tube 26 may be suitably retained in place by means such as a spring clip 29 of any suitable construction.

In order to prevent liquid inside the vent tube 26 from flowing out or dripping after the filling apparatus has been released, I prefer to employ a valve member 30 having a long valve stem 31 extending up through the vent tube 26. The bell-shaped opening 27 in the vent tube is preferably of a suitable shape to provide a good valve seat for the valve head 30. The upper end of valve stem 31 may be provided with a block 32 of square or other suitable cross section having flat sides, and having a hole 45 drilled therethrough for pivotal attachment to one end of a rocker arm 33.

Substantially parallel to the air tube 26, a tubular member 34 may be fixed in another opening in the reservoir 10 by means of the integral shoulder 35 and the nut 36. The rod 24 extends up through this tube 34 and is normally urged downward by the action of spring 37 against the collar 38 fixed to rod 24. The upper end of rod 24 is pivotally connected with the other end of rocker arm 33. To provide an intermediate pivot for this rocker arm a collar 39 may be sweated on the top of tube 34 and provided with an upward extending arm 40. Arm 40 may have a pin 41a affixed thereto which projects a suitable distance on each side of the arm.

Rocker arm 33 preferably comprises three members which may be welded or soldered together to form a single piece, including two rocker arm sections 41 and 42 each attached to the spring clip 43. Intermediate the ends of these members 41 and 42, and preferably at the point of attachment of the spring clip ends, holes are drilled through these members and the spring clip ends for registration with the ends of pin 41a. Holes may also be provided at one end of the rocker arm members so that they may be snapped on over the pin 44 which is fixed to the top of rod 24 with its ends projecting from the sides thereof. The other ends of the rocker members 41 and 42 are preferably provided with small sized pins arranged to fit into the hole 45 in the top section of rod 31. With such an arrangement the rocker arm 33 can only be replaced in one position after cleaning.

The preferred operation of my apparatus is as follows: Bottle 12 is moved up in alignment with the nozzle member 17 until it presses firmly against a suitable rubber ring 46 which may be of known construction. Sufficient pressure of the bottle neck against this rubber ring serves to move the nozzle member 17 over the tube 14 with a telescoping action, thus compressing spring 21. Sleeve 20 is also moved upward by the collar portion 19 bringing the collar 23a into contact with the collar 38. The vent tube 26 remains in its original position and thus the milk or other liquid is allowed to flow, to a limited extent, between the nozzle portion 18 and the flared end 27 of the vent tube into the bottle. Continued upward movement of bottle 12, nozzle 17, and sleeve 20 to the position illustrated in Fig. 3 serves to complete the opening of the milk valve. Substantially simultaneously with the opening of this milk valve, the rod 24 is moved upward by the lifting action of collar 23a against collar 38 moving the rocker arm 33 about the pivot pin 41a. This lowers rod 31 and consequently opens the valve 30 allowing air to escape up the air tube 26. As the bottle becomes full of liquid, this liquid flows up into the tube 26 to about the level of the milk in the reservoir. The bottle is now full of liquid except for the space occupied by the filling apparatus in the neck thereof. As the bottle moves down away from the filling nozzle, valve 30 is promptly closed by spring 37 and subsequently a slight amount of additional liquid flows into the bottle through the liquid outlet of the nozzle, thus adjusting the liquid level in the bottle. This may be readily adjusted by varying the gap between the collar 23a and the collar 38, which governs the timing relationship between the closing of the air valve and the closing of the milk valve. As the bottle drops away from the filling nozzle, the air and milk valves are tightly closed and drippage is effectively prevented. Since the air valve is opened after the opening of the milk valve, the air valve is closed first and retains the milk in the vent tube 26 without allowing it to run out and overfill the bottle.

It will be apparent that the apparatus of my invention may be rendered adjustable to vary the timing of the air and milk valves in any suitable manner. For example, the collar 38 may be adjustably attached to the rod 24, or the arm 23 may be made adjustable to different positions to vary the gap between collar 23a and collar 38 as desired. Washers or shims may also be placed between the sleeve 20 and collar portion 19 to reduce this gap.

An important advantage of my invention resides in the provision of an interchangeable apparatus. By merely changing the nozzle member 17 and the vent tube 26, for similar parts of different size, the apparatus is adapted to fill bottles in accordance with the new principles of my invention, having necks of different internal diameters.

On the other hand, the apparatus may be readily converted to the old type of filler which allows milk to flow out of the vent tube into the bottle after the milk valve has been closed, by simply removing air valve 30 and its operating mechanism.

By offsetting the air valve operating mechanism laterally from the filling nozzle proper, the air valve may be used or not as desired. A further advantage of this feature is the simplification of the filling nozzle mechanism; this is especially important where the filling nozzle is of small diameter suitable for filling small neck bottles and other containers.

In apparatus according to this invention, the valve stem 31 may be reduced to a very small size, such that it offers no substantial obstruction to the vent tube 26, since this valve stem is never subjected to any substantial compression strain. All of the strain on this member occurs when the air valve is closed and is purely tension produced by spring 37. This spring 37 should be of just sufficient strength to maintain the air valve tightly closed.

The apparatus disclosed may also be easily dismantled for cleaning. By simply unsnapping and removing the rocker arm members 41, 42 and 43 as one piece, and removing clip 29, the complete filling nozzle and air valve operating mechanism are free to drop out. If, on the other hand, liquid is still contained in the reservoir 10, the valve 30 and its operating mechanism may be readily removed by taking off the rocker arm 33 and moving rod 24 upward until the sleeve 20 and arm 23 may be swung to one side free of the collar 38.

It will be manifest from the foregoing description that the apparatus of my invention has outstanding advantages especially when used for filling small neck bottles with milk and similar liquids.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for filling a small neck container with liquid material comprising a nozzle for flowing liquid into said container, a vent tube for the escape of air displaced by said liquid, said nozzle and vent tube cooperating to form a valve controlling the flow of liquid, valve means for said vent tube, and means exterior of said nozzle actuated by the opening of said liquid valve for opening said valve means.

2. Apparatus for filling a small neck container with liquid material comprising a nozzle for flowing liquid into said container, a vent tube for the escape of air displaced by said liquid, said nozzle and vent tube cooperating to form a valve controlling the flow of liquid, valve means for said vent tube, and means offset laterally from said nozzle and actuated by the opening of said liquid valve for opening said valve means.

3. Apparatus for filling a small neck container with liquid material comprising a nozzle for flowing liquid into said container, a vent tube for the escape of air displaced by said liquid, valve means for said nozzle, valve means for said vent tube, and means offset laterally from said nozzle and actuated by said first named valve means for operating said second named valve means immediately after opening and immediately before closing of said first named valve means.

4. Filling apparatus comprising a nozzle for flowing liquid into a container, a vent tube disposed within said nozzle, means for closing the lower end of said vent tube including a member having an upper portion projecting above the top of said vent tube, and means offset laterally from said nozzle and actuated by the operation of said nozzle, for moving said member longitudinally of the vent tube.

5. Filling apparatus comprising a liquid reservoir, a nozzle for flowing milk from said reservoir to a container, a tubular member extending to a point above the liquid level in said reservoir for allowing air in said container displaced by liquid to escape, valve means in the lower portion of said member, and means for operating said valve means through said tubular member including a rocker arm positioned above the liquid level in said reservoir and actuated by spring means.

6. In filling apparatus a liquid reservoir, a filling nozzle in the lower portion of said reservoir, a vent tube associated with said nozzle and extending above the level of liquid in said reservoir, a hollow member offset laterally from said tube, valve means in the lower portion of said vent tube, and means operating through said member and vent tube for closing said valve means.

7. In filling apparatus a liquid reservoir, a filling nozzle in the lower portion of said reservoir, a vent tube associated with said nozzle and extending above the level of liquid in said reservoir, a hollow member offset laterally from said tube, valve means in the lower portion of said vent tube, a rocker arm above said member and tube connected to said valve means, and means operating through said member for actuating said rocker arm to open and close said valve means.

8. In filling apparatus a liquid reservoir, a filling nozzle in the lower portion of said reservoir, a vent tube associated with said nozzle and extending above the level of liquid in said reservoir, a hollow member offset laterally from said tube, valve means in the lower portion of said vent tube, a rocker arm above said member and tube connected to said valve means, and resilient means operating through said member for actuating said rocker arm to close said valve means.

9. In filling apparatus a liquid reservoir, a filling nozzle in the lower portion of said reservoir, a vent tube associated with said nozzle and extending above the level of liquid in said reservoir, a hollow member offset laterally from said tube, valve means in the lower portion of said vent tube, a rocker arm above said member and tube connected to said valve means, means operating through said member for actuating said rocker arm to operate said valve means, and resilient means for operating said actuating means to close said valve means.

10. In filling apparatus a liquid reservoir, a filling nozzle in the lower portion of said reservoir, a vent tube associated with said nozzle and extending above the level of liquid in said reservoir, a hollow member offset laterally from said tube, valve means in the lower portion of said vent tube, a rocker arm above said member and tube connected to said valve means, means operating through said member for actuating said rocker arm to operate said valve means, resilient means for operating said actuating means to close said valve means, and means associated with said nozzle for operating said actuating means to open said valve means.

LESLIE A. MAPES.